United States Patent [19]

Helbrecht et al.

[11] Patent Number: 5,302,195
[45] Date of Patent: Apr. 12, 1994

[54] INK COMPOSITIONS CONTAINING CYCLODEXTRINS

[75] Inventors: Barbel Helbrecht, Oakville; Marcel P. Breton, Mississauga; Kerstin M. Henseleit, Toronto; Melvin D. Croucher, Oakville, all of Canada

[73] Assignee: Xerox Corporation, Stamford, Conn.

[21] Appl. No.: 704,161

[22] Filed: May 22, 1991

[51] Int. Cl.$^5$ ............................................. C09D 11/14
[52] U.S. Cl. ............................ 106/25 R; 106/22 F; 106/217
[58] Field of Search ............... 106/25, 22, 217, 25 R, 106/22 F

[56] References Cited

U.S. PATENT DOCUMENTS

| | | | |
|---|---|---|---|
| 90,417 | 5/1869 | Zengler | 106/25 |
| 1,325,971 | 12/1919 | Akashi | 106/25 |
| 1,404,355 | 1/1922 | Evans et al. | 106/25 |
| 1,479,533 | 1/1924 | Cooney | 106/25 |
| 1,607,060 | 11/1926 | Dean | 106/25 |
| 2,684,303 | 7/1954 | Leonard et al. | 106/25 |
| 3,361,582 | 1/1968 | Lewis | 106/14.5 |
| 4,838,938 | 6/1989 | Tomida et al. | 106/25 |
| 5,108,505 | 4/1992 | Moffatt | 106/25 |

FOREIGN PATENT DOCUMENTS

| | | |
|---|---|---|
| 014569 | 2/1981 | Japan . |
| 146974 | 6/1989 | Japan . |
| 210477 | 8/1989 | Japan . |
| 299083 | 12/1989 | Japan . |

*Primary Examiner*—Helene Klemanski
*Attorney, Agent, or Firm*—Judith L. Byorick

[57] ABSTRACT

Disclosed is an ink composition which comprises an aqueous liquid vehicle, a dye, and a cyclodextrin. The ink is particularly suitable for ink jet printing processes, especially thermal ink jet printing processes. Also disclosed is a process for generating images onto a substrate which comprises incorporating an ink composition comprising an aqueous liquid vehicle, a dye, and a cyclodextrin into an ink jet printing apparatus and causing droplets of the ink composition to be ejected in an imagewise pattern onto the substrate.

37 Claims, 1 Drawing Sheet

INK COMPOSITIONS CONTAINING CYCLODEXTRINS

BACKGROUND OF THE INVENTION

The present invention is directed to ink compositions. More specifically, the present invention is directed to aqueous ink compositions that are particularly suitable for use in ink jet printing processes. One embodiment of the present invention is directed to an ink composition which comprises an aqueous liquid vehicle, a dye, and a cyclodextrin.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles necessary for high resolution printing, and physical limitations of the transducer result in low ink drop velocity. Low drop velocity seriously diminishes tolerances for drop velocity variation and directionality, thus impacting the system's ability to produce high quality copies, and also decreases printing speed. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

U.S. Pat. No. 90,417 (Zengeler) discloses a dry powder ink containing dextrine, British gum, roasted starch, gum-arabic, or any other soluble gum or mucilaginous substance in combination with a mixture of aniline or any of its salts or compounds with oxidizing agents of any kind, such as chlorate or bichromate of potassa, sulfate, acetate, or chloride of copper, or the like. The dry powder produces a black indelible stain or dye, irremovable by acids or alkalies, when the compound is mixed or diluted with water and applied to absorbent or adherent surfaces or substances.

U.S. Pat. No. 1,325,971 (Akashi) discloses a solid ink comprising a mixture of a dye with dextrin, soluble gum tragacanth, thymol, and lactic acid, the mixture being sufficiently kneaded together by the addition of a small quantity of water so as to produce a plastic or pasty substance. When put into water, the composition gives at once a liquid ink clearly colored corresponding to the coloring material employed.

U.S. Pat. No. 1,404,355 (Evans et al.) discloses a printing ink which is a mixture of a viscous liquid comprising by weight at least 40 percent of a polyhydric alcohol of the saturated series and a relatively small amount of a solution of a film-forming material, together with a solid drying agent. Examples of water solutions of film-forming materials include glue, gum arabic, cherry gum, dextrine, and starch.

U.S. Pat. No. 1,479,533 (Cooney) discloses an ink in the form of paste comprising water, white potato dextrin, gallic acid, ferrous sulfate, hydrochloric acid, carbolic acid, glycerine, and coloring matter. The ink paste is rendered fluid for use by the addition of water, providing a writing fluid free of suspended matter.

U.S. Pat. No. 1,607,060 (Dean) discloses a glossy water color ink composition prepared by admixing water with a solution comprising gum arabic soap, starch, dextrine, a tar product adapted to prevent the mixture from souring, glucose, and water.

U.S. Pat. No. 2,684,303 (Leonard et al.) discloses a high reflectance quick drying marking ink suitable for inscribing on glass and clear solid plastic surfaces which comprises a dispersion of from about 18 to about 22 percent by weight titanium dioxide in a water solution of from about 7 to about 10 percent by weight dextrin in which the weight ratio of titanium dioxide to dextrin is between about 2¼ and about 2⅞ to 1, the dispersion being thickened with from about 0.2 to about 0.4 percent by weight gum tragacanth and with from about 0.9 to about 1.1 percent by weight bentonite, and further containing from about 1.5 to about 2.5 percent by weight diethylene glycol monomethyl ether and a small amount of a microbicide and of a wetting agent.

U.S. Pat. No. 3,361,582 (Lewis) discloses a base vehicle for water content water color printing inks containing sodium caseinate, tapioca dextrine, sulfonated castor oil, water, glycerine, formaldehyde solution, ammonium hydroxide, urea, and hydrated lime.

Although known compositions are suitable for their intended uses, a need continues to exist for ink compositions suitable for use in ink jet printing processes. In addition, a need remains for ink compositions particularly suitable for thermal ink jet printing processes. Further, there is a need for ink compositions that exhibit rapid drying times. There is also a need for ink compositions that have aqueous liquid vehicles and contain oil soluble or alcohol soluble dyes. Additionally, there is a need for ink compositions with aqueous liquid vehicles that exhibit improved waterfastness compared to aqueous inks containing water soluble dyes.

SUMMARY OF THE INVENTION

It is an object of the present invention to provide ink compositions suitable for use in ink jet printing processes.

It is another object of the present invention to provide ink compositions particularly suitable for thermal ink jet printing processes.

It is yet another object of the present invention to provide ink compositions that exhibit rapid drying times.

It is still another object of the present invention to provide ink compositions that have aqueous liquid vehicles and contain oil soluble or alcohol soluble dyes.

Another object of the present invention is to provide ink compositions with aqueous liquid vehicles that exhibit improved waterfastness compared to aqueous inks containing water soluble dyes.

These and other objects of the present invention (or specific embodiments thereof) can be achieved by providing an ink composition which comprises an aqueous liquid vehicle, a dye, and a cyclodextrin. Another object of the present invention is directed to a process for generating images onto a substrate which comprises incorporating an ink composition comprising an aqueous liquid vehicle, a dye, and a cyclodextrin into an ink jet printing apparatus and causing droplets of the ink composition to be ejected in an imagewise pattern onto the substrate.

DETAILED DESCRIPTION OF THE INVENTION

Figure 1:
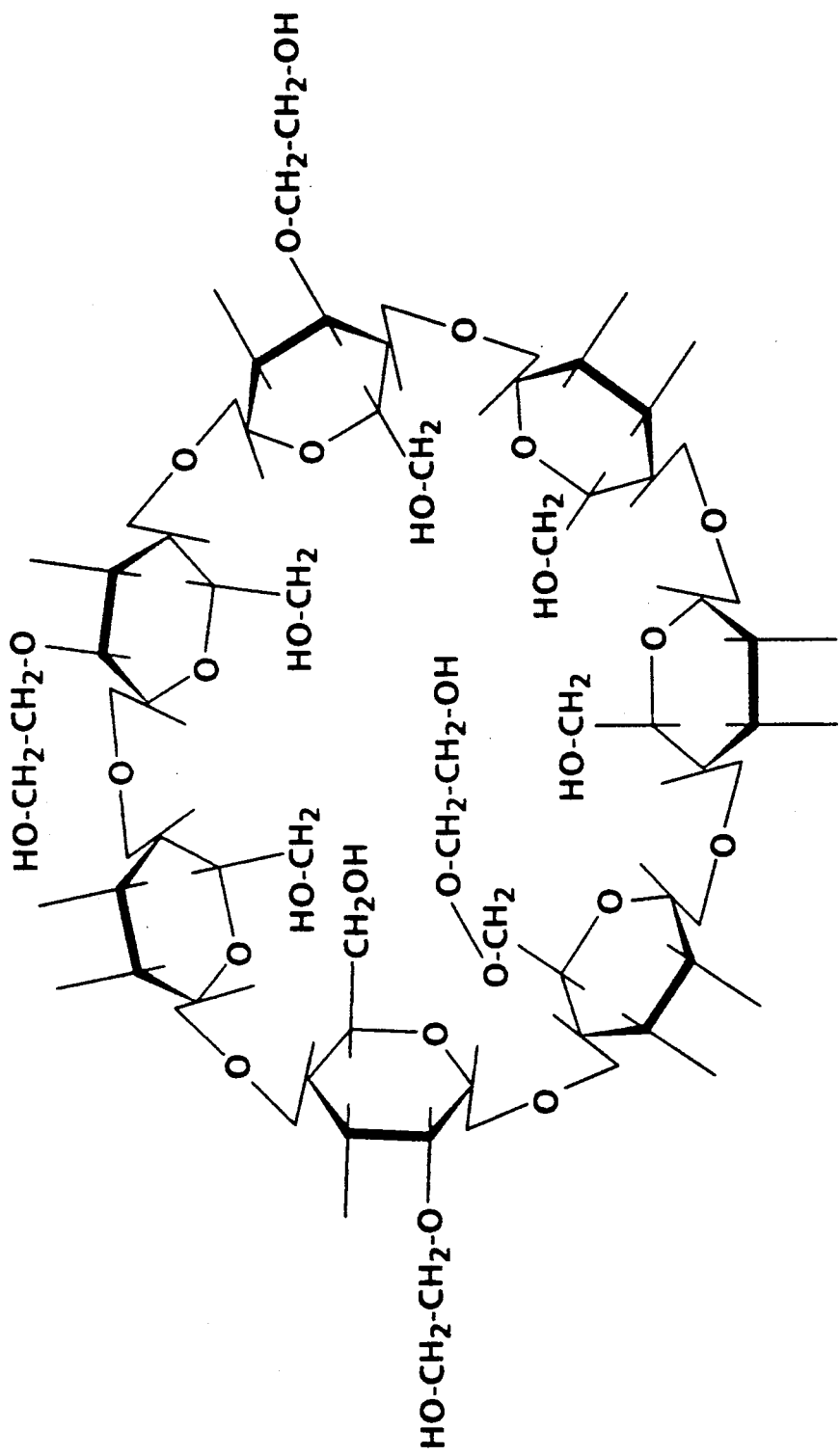
FIG. 1 illustrates the structure of one example of a suitable cyclodextrin compound for the inks of the present invention.

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50. The non-water component of the liquid vehicle generally serves as a humectant which has a boiling point higher than that of water (100° C.). In the inks of the present invention, the liquid vehicle is generally present in an amount of from about 85 to about 99.5 percent by weight, and preferably from about 90 to about 99 percent by weight.

The preferred colorants for the inks of the present invention are oil soluble dyes or alcohol soluble dyes. These dyes generally exhibit substantial solubility in organic liquids such as oils or alcohols but exhibit little or no solubility in water. Preferred dyes typically have water solubilities of from 0 to about 10 grams of dye per liter of water, and preferably have water solubilities of less than 1 gram of dye per liter of water. The colorant for the inks of the present invention can be a dye or mixture of dyes. The dye or mixture of dyes is present in any effective amount. Typically, the total amount of dye in the ink compositions of the present invention is from about 0.5 to about 10 percent by weight, preferably from about 2 to about 5 percent by weight, although the amount can be outside of these ranges.

Examples of suitable dyes include all Sudan dyes available from BASF, such as Sudan Blue 670 (C.I. Solvent Blue 35, 61554, an anthraquinone dye with a solubility in water of less than 1 gram of dye per liter of water at 20° C.), Sudan Black X60 (C.I. Solvent Black 3, 26150, an azo dye insoluble in water), Sudan Blue OS (a copper phthalocyanine dye, $C_{104}H_{164}CuN_{12}O_8S_4$, insoluble in water), Sudan Orange 220 (C.I. Solvent Yellow 14, 12055, an azo dye (1-(phenylazo)-2-naphtholenol) insoluble in water); Oil Blue N (C.I. Solvent Blue 14, 61555, insoluble in water, available from Aldrich Chemical Company, Inc.), Oil Brown 102 (C.I. Solvent Red 2, insoluble in water, available from Passaic Color & Chemical Company), Oil Red 234 (C.I. Solvent Red 24, 26105, a bisazo dye insoluble in water, available from Passaic Color & Chemical Company), Orasol Blue 2GLN (C.I. Solvent Blue 48, a copper phthalocyanine sulfamide insoluble in water, available from Ciba-Geigy), Oracet Pink RF (C.I. Pigment Red 181, 73360, a thioindigoid insoluble in water, available from Ciba-Geigy), Orasol Black RL (C.I. Solvent Black 29, a monoazo dye-chrome complex insoluble in water, available from Ciba-Geigy), Orasol Red G (C.I. Solvent Red 125, a co-complex dye insoluble in water, available from Ciba-Geigy), Orasol Yellow 2GLN (C.I. Solvent Yellow 88, a chrome complex insoluble in water, available from Ciba-Geigy), Savinyl Blue GLS (C.I. Solvent Blue 44, a phthalocyanine dye insoluble in water, available from Sandoz Chemicals), Savinyl Fire Red 3GLS PAT (C.I. Solvent Red 124, a cobalt metallized azo dye insoluble in water, available from Sandoz Chemicals), Savinyl Yellow RLS (C.I. Solvent Yellow 83:1, a chromium metallized azo dye insoluble in water), and the like, as well as mixtures thereof.

The ink compositions of the present invention also contain a cyclodextrin. Cyclodextrins are cyclic oligosaccharides, typically prepared by the enzymatic degradation of starch (a linear polysaccharide), which consist of glucose monomers arranged in a donut-shaped ring. The alphacyclodextrins contain 6 glucose monomers, the beta-cyclodextrins contain 7 glucose monomers, the gamma-cyclodextrins contain 8 glucose monomers, and the like. Cyclodextrins with 9, 10, 11, and 12 glucose monomers are also known, as disclosed in, for example, D. W. Griffiths and M. L. Bender, *Adv. Cat.*, Vol. 23, page 209 (1973), the disclosure of which is totally incorporated herein by reference. Cyclodextrins are commercially available from, for example, American Maize-Products Company, Corn Processing Division, 1100 Indianapolis Blvd., Hammond, Ind. 46320-1094.

The cyclodextrins suitable for the inks of the present invention can, if desired, be modified by the addition of substituents. Substituents generally replace either the entire hydroxyl group or the hydrogen atom on one or more of the hydroxyl groups of the cyclodextrin ring. Examples of substituents include acyl groups, wherein one or more of the hydroxyl groups is replaced with groups such as —OAc, —OC(O)CH$_2$CH$_3$, —OC(O)(CH$_2$)$_2$CH$_3$, —OC(O)(CH$_2$)$_3$CH$_3$, —OC(O)CF$_3$, —OC(O)Ph, or the like; alkyl and aryl groups, wherein one or more of the hydroxyl groups is replaced with groups such as —OCH$_3$, —OCH$_2$CH$_3$, —O(CH$_2$)$_2$CH$_3$, —OC(CH$_3$)$_3$, —OPh, or the like; tosyl (4-methylbenzenesulfonyl), or Ts or related groups, wherein one or more of the hydroxyl groups is replaced with —OTs or the like; mesyl (methanesulfonyl, or Ms) or related groups, wherein one or more of the hydroxyl groups is replaced with —OMs or the like; amino groups, wherein one or more of the hydroxyl groups is replaced with groups such as a primary, secondary, or tertiary amine group, including cyclic amines and aromatic amines or the like; azido groups, wherein one or more of the hydroxyl groups is replaced with —N$_3$ or the like; halo substituents, wherein one or more of the hydroxyl groups is replaced with a halogen atom, such as —F, —Cl, —Br, or —I; nitro groups, wherein one or more of the hydroxyl groups is replaced with —ONO$_2$; phosphorus-containing groups, wherein one or more of the hydroxyl groups is replaced with groups such as —OPO$_3$H$_2$, —OPO$_3$R$_2$ (wherein R is alkyl or aryl), —OPO$_3$HR, or wherein two adjacent hydroxyl groups are replaced with groups such as —OP(O)(CH$_3$)O—, or the like; imidazole groups and their derivatives; pyridine groups and their derivatives; sulfur-containing functional groups, wherein one or more of the hydroxyl groups is replaced with groups such as —SCH$_3$, —SCH$_2$CH$_3$, —S(CH$_2$)$_2$CH$_3$, —SC(CH$_3$)$_3$, —OSO$_3$⁻Na⁺, —OCH$_2$SO$_3$⁻Na⁺, —OCH$_2$CH$_2$SO$_3$⁻Na⁺, —O(CH$_2$)$_3$SO$_3$⁻Na⁺, or the like; alcohol, aldehyde, ketone, or oxime groups; carboxylic acid groups and their derivatives; carbonate and carbamate groups; silicon, boron, or tin containing groups, wherein one or more of the hydroxyl groups is replaced with groups such as —OSi(CH$_3$)$_3$, —OSi(CH$_3$)$_2$H, —CH$_2$OSi(CH$_3$)$_3$, —CH$_2$OSi(CH$_3$)$_2$H, —OB(CH$_2$CH$_2$)$_2$, —CH$_2$OB(CH$_2$CH$_2$)$_2$, —CH$_2$OSn((CH$_2$)$_3$CH$_3$)$_3$, or the like; hydroxyalkyl groups, such as hydroxy ethyl groups, hydroxypropyl groups, or the like; or any other suitable substituent. One example of a modified cyclodextrin molecule is the hydroxyethyl-substituted β-cyclodextrin shown in FIG. 1, available from American Maize-Products Company. This particular substituted cyclodextrin contains 3.6 moles of substituent per mole of cyclodextrin, with a substitution level of 11.2 percent. Substituted cyclodextrins are also shown in the publication "Molecusol ™: Your Research Solution," Pharmetec, Inc. (1988), the disclosure of which is totally incorporated herein by reference. The hydroxypropyl substituted cyclodextrin is also suitable for the present invention.

Cyclodextrin rings can also be bound together to form polymers by processes such as linking the cyclodextrin rings together with suitable multifunctional agents. For example, a poly-β-cyclodextrin can be formed that is crosslinked with epichlorohydrin; this material is commercially available from American Tokyo Kasei, Inc., 9211 N. Harborgate St., Portland, Oreg. 97203.

Additional information regarding cyclodextrins and modified cyclodextrins is widely available in the chemical literature, and is summarized in, for example, "Synthesis of Chemically Modified Cyclodextrins," A. P. Croft and R. A. Bartsch, *Tetrahedron*, Vol 39, No. 9, pages 1417 to 1474 (1983), the disclosure of which is totally incorporated herein by reference.

The internal cavity of the cyclodextrin molecule is hydrophobic in nature, and has the ability to complex in all or in part and contain "guest" molecules. In the inks of the present invention, it is believed that the cyclodextrin molecules complex and contain the oil soluble or alcohol soluble dye molecules, thereby improving the water dispersability of the dye and enabling an aqueous ink containing a stable dispersion of the dye. For the inks of the present invention, it is preferred that the particles formed by the dye/cyclodextrin complex are less than about 250 nanometers in average diameter, and more preferred that they be less than about 200 nanometers in average diameter. Since the dye is substantially insoluble in water, the prints formed with the ink have improved waterfastness.

The cyclodextrin component is present in the inks of the present invention in any effective amount, typically from about 1 to about 9 percent by weight, and preferably from about 2 to about 5 percent by weight, although the amount can be outside of this range.

Other additives can also be present in the inks of the present invention. For example, one or more surfactants or wetting or dispersing agents can be added to the ink. These additives may be of the cationic, anionic, or nonionic types. Suitable surfactants and wetting or dispersing agents include Tamol ®SN, Tamol ®LG, those of the Triton ® series available from Rohm and Haas Company, those of the Marasperse ® series, those of the Igepal ® series available from GAF Company, those of the Tergitol ® series, Strodex PK-90, available from GAF, Pluronic F-68, available from BASF, Karasperse TU, available from Marasperse, and other commercially available surfactants. These surfactants and wetting agents are present in any effective amounts, generally from 0 to about 15 percent by weight, and preferably from about 0.01 to about 8 percent by weight.

Polymeric additives or dispersants can also be added to the inks of the present invention to enhance the viscosity of the ink. Examples include water soluble polymers such as Gum Arabic, polyacrylate salts, polymethacrylate salts, polyvinyl alcohols, hydroxypropylcellulose, hydroxyethylcellulose, polyvinylpyrrolidinone, polyvinylether, starch, polyethylene oxice, polysaccharides, sodium salt of naphthalene sulfonate formaldehyde copolymer, sodium salt of alkylbenzene sulfonate, sodium salt of dialkylsulfosuccinate, sodium salt of lignosulfonate, sodium alkylene oxide copolymer, sodium salt of alkyletherphosphate, and the like. In addition, polymers such as hydroxypropylpolyethyleneimine (HPPEI-200) or other polyethyleneimine derivatives can be added to the ink. Polymeric additives can be present in the ink of the present invention in any effective amounts, typically from 0 to about 10 percent by weight, and preferably from about 0.01 to about 5 percent by weight.

Other optional additives to the inks of the present invention include humectants such as ethylene glycol, diethylene glycol, N-methylpyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight, pH controlling agents such as acids or bases, phosphate salts, carboxylate salts, sulfite salts, amine salts, and the like, present in an amount of from 0 to about 10 percent by weight and preferably from about 0.01 to about 2 percent by weight.

The ink compositions of the present invention are generally of a viscosity suitable for use in thermal ink jet printing processes. Typically, the ink viscosity is no more than about 5 centipoise, and preferably is from about 1 to about 2.5 centipoise.

Ink compositions of the present invention can be prepared by any suitable process. Typically, the inks are prepared by simple mixing of the ingredients. One process entails mixing all of the ink ingredients together, heating the mixture to a temperature of from about 40° C. to about 55° C. for a period of from about 2 to about 3 hours, subsequently cooling the mixture to room temperature (typically from about 10° to about 35° C.), and filtering the mixture to obtain an ink.

The present invention is also directed to a process which entails incorporating an ink composition comprising an aqueous liquid vehicle, a colorant, and a cyclodextrin into an ink jet printing apparatus and causing droplets of the ink composition to be ejected in an imagewise pattern onto a substrate. In a particularly preferred embodiment, the printing apparatus employs a thermal ink jet process. Any suitable substrate can be employed, including plain papers such as Xerox ® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by dissolving 2.0 grams of β-cyclodextrin, obtained from American Maize-Products Company, in 80.0 grams of deionized water and 5.0 grams of diethylene glycol at 50° C. with constant stirring. To the resulting mixture was added dropwise and with continuous stirring a solution of 3.0 grams of Orasol Blue 2 GLN dye in 10.0 grams of 1-methyl-2-pyrrolidinone. The resulting ink was allowed to cool to room temperature. The ink contained dye/β-cyclodextrin complex particles with particle sizes of 498 nanometers, as measured with a Brookhaven Bl-90 particle sizer. The ink was then subjected to three 2 minute periods of sonification with a Heat Systems Ultrasonics, Inc. W-375 Sonicator to reduce the particle size further to 363 nanometers.

EXAMPLE II

An ink composition was prepared by dissolving 2.0 grams of β-cyclodextrin, obtained from American Maize-Products Company, in 80.0 grams of deionized water and 5.0 grams of diethylene glycol at 50° C. with constant stirring. To the resulting mixture was added dropwise and with continuous stirring a solution of 8.0 grams of Savinyl Blue GLS dye in 10.0 grams of 1-methyl-2-pyrrolidinone. The resulting ink was allowed to cool to room temperature. The ink contained dye/β-cyclodextrin complex particles with particle sizes of 480 nanometers, as measured with a Brookhaven Bl-90 particle sizer. The ink was then subjected to three 2 minute periods of sonification with a Heat Systems Ultrasonics, Inc. W-375 Sonicator to reduce the particle size further to 417 nanometers.

EXAMPLE III

An ink composition was prepared by dissolving 1.6 grams of β-cyclodextrin, obtained from American Maize-Products Company, in 82.7 grams of deionized water and 5.0 grams of diethylene glycol at 50° C. with constant stirring. To the resulting mixture was added dropwise and with continuous sonification with a Heat Systems Ultrasonics, Inc. W-375 Sonicator a solution of 0.7 gram of Orasol Blue 2 GLN dye in 10.0 grams of N-methyl pyrrolidinone. Sonification was continued for a period of 7 minutes, after which the resulting ink was allowed to cool to room temperature. The ink contained dye/β-cyclodextrin complex particles with particle sizes of 200 nanometers, as measured with a Brookhaven Bl-90 particle sizer.

EXAMPLE IV

An ink composition was prepared by dissolving 2.0 grams of β-cyclodextrin, obtained from American Maize-Products Company, in 71.0 grams of deionized water and 5.0 grams of diethylene glycol at 50° C. with constant stirring. To the resulting mixture was added dropwise and with continuous sonification with a Heat Systems Ultrasonics, Inc. W-375 Sonicator a solution of 2.0 grams of Savinyl Blue GLS dye in 20.0 grams of N-methyl pyrrolidinone. Sonification was continued for a period of 7 minutes, after which the resulting ink was allowed to cool to room temperature. The ink contained dye/β-cyclodextrin complex particles with particle sizes of 233 nanometers, as measured with a Brookhaven Bl-90 particle sizer.

EXAMPLE V

Ink compositions were prepared by dissolving 2.0 grams of β-cyclodextrin, obtained from American Maize-Products Company, in 80.8 grams of deionized water and 5.0 grams of diethylene glycol at 50° C. with constant stirring. To the resulting mixture was added dropwise and with constant stirring 0.2 gram of a surfactant (for ink VA, Strodex PK-90, obtained from GAF, for ink VB, Pluronic F-68, obtained from BASF, for ink VC, Karasperse TU, obtained from Marasperse). After the surfactant had dissolved completely, a solution of 2.0 grams of Orasol Blue 2GLN dye in 10.0 grams of N-methyl pyrrolidinone was added dropwise and with continuous sonification with a Heat Systems Ultrasonics, Inc. W-375 Sonicator. Sonification was continued for a period of 7 minutes, after which the resulting ink was allowed to cool to room temperature. These three inks, as well as a fourth control ink prepared by the same process but containing no surfactant, were then centrifuged for 5 minutes at 5,000 revolutions per minute. All of the inks contained dye/β-cyclodextrin complex particles with particle sizes of less than 500 nanometers, as measured with a Brookhaven Bl-90 particle sizer. Actual particle sizes were as follows:

| Surfactant | Particle Diameter |
| --- | --- |
| none (control) | 197 nm |
| Strodex PK-90 | 212 nm |
| Pluronic F-68 | 231 nm |
| Karasperse TU | 223 nm |

Addition of a surfactant did not affect the particle size. All of the inks containing a surfactant were very stable in that no particles were observed to settle out of the dispersion.

EXAMPLE VI

An ink composition was prepared by dissolving 2.0 grams of β-cyclodextrin, obtained from American Maize-Products Company, in 61.0 grams of deionized water and 5.0 grams of diethylene glycol at 50° C. with constant stirring. To the resulting mixture was added dropwise and with continuous sonification with a Heat Systems Ultrasonics, Inc. W-375 Sonicator a solution of 2.0 grams of Orasol Blue 2GLN dye in 30.0 grams of N-methyl pyrrolidinone. sonification was continued for a period of 7 minutes, after which the resulting ink was allowed to cool to room temperature. The ink contained dye/β-cyclodextrin complex particles with particle sizes of 192 nanometers, as measured with a Brookhaven Bl-90 particle sizer.

The ink was then filtered and incorporated into a Hewlett-Packard DeskJet thermal ink jet printer and prints were generated on Port Edward 10 Smooth paper. The following optical densities, showthrough (a measure of the optical density observed on the side of the paper opposite to that on which the ink was jetted; generally showthrough values of up to about 0.15 or 0.20 are considered acceptable), waterfastness, and drying times were observed:

| Paper Side | Optical Density | Showthrough | Waterfastness (%) | Drying Time (seconds) |
| --- | --- | --- | --- | --- |
| Felt | 0.82 | 0.10 | 84.4 | 39 |
| Wire | 0.81 | 0.09 | 87.7 | 32 |

It is believed that the relatively low optical densities observed resulted from the relatively low dye content in the ink, and that optical density will be increased upon addition of additional dye to the ink.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition which comprises an aqueous liquid vehicle, a dye which exhibits a water solubility of less than about 1 gram of dye per liter of water, and a cyclodextrin in an effective amount to enable a stable dispersion of the dye in the aqueous liquid vehicle, wherein the concentration by weight of the cyclodextrin in the ink is equal to two thirds or less of the concentration by weight of the dye in the ink.

2. An ink composition according to claim 1 wherein the cyclodextrin is present in an amount of from about 1 to about 9 percent by weight.

3. An ink composition according to claim 1 wherein the cyclodextrin is present in an amount of from about 2 to about 5 percent by weight.

4. An ink composition according to claim 1 wherein the cyclodextrin is beta-cyclodextrin.

5. An ink composition according to claim 1 wherein the cyclodextrin is alpha-cyclodextrin.

6. An ink composition according to claim 1 wherein the cyclodextrin is gamma-cyclodextrin.

7. An ink composition according to claim 1 wherein the dye is an oil soluble dye.

8. An ink composition according to claim 1 wherein the dye is an alcohol soluble dye.

9. An ink composition according to claim 1 wherein the dye is selected from the group consisting of Orasol Blue 2GLN, Savinyl Blue GLS, and mixtures thereof.

10. An ink composition according to claim 1 wherein the dye is present in an amount of from about 0.5 to about 10 percent by weight.

11. An ink composition according to claim 1 wherein the dye and the cyclodextrin form complex particles with an average diameter of less than about 250 nanometers.

12. An ink composition according to claim 1 wherein the dye and the cyclodextrin form complex particles with an average diameter of less than about 200 nanometers.

13. A process for generating images onto a substrate which comprises incorporating an ink composition comprising an aqueous liquid vehicle, a dye which exhibits a water solubility of less than about 1 gram of dye per liter of water, and a cyclodextrin in an effective amount to enable a stable dispersion of the dye in the aqueous liquid vehicle into an ink jet printing apparatus and causing droplets of the ink composition to be ejected in an imagewise pattern onto the substrate, wherein the concentration by weight of the cyclodextrin in the ink is equal to two thirds or less of the concentration by weight of the dye in the ink.

14. A process according to claim 13 wherein the cyclodextrin is present in an amount of from about 1 to about 9 percent by weight.

15. A process according to claim 13 wherein the cyclodextrin is present in an amount of from about 2 to about 5 percent by weight.

16. A process according to claim 13 wherein the cyclodextrin is beta-cyclodextrin.

17. A process according to claim 13 wherein the cyclodextrin is alpha-cyclodextrin.

18. A process according to claim 13 wherein the cyclodextrin is gamma-cyclodextrin.

19. A process according to claim 13 wherein the dye is an oil soluble dye.

20. A process according to claim 13 wherein the dye is an alcohol soluble dye.

21. A process according to claim 13 wherein the dye is selected from the group consisting of Orasol Blue 2GLN, Savinyl Blue GLS, and mixtures thereof.

22. A process according to claim 13 wherein the dye is present in an amount of from about 0.5 to about 10 percent by weight.

23. A process according to claim 13 wherein the dye and the cyclodextrin form complex particles with an average diameter of less than about 250 nanometers.

24. A process according to claim 13 wherein the dye and the cyclodextrin form complex particles with an average diameter of less than about 200 nanometers.

25. A process according to claim 13 wherein the ink jet printing apparatus employs a thermal ink jet printing process and droplets of ink are caused to be ejected by selectively heating the ink.

26. An ink composition which comprises an aqueous liquid vehicle, a dye which exhibits a water solubility of less than about 1 gram of dye per liter of water, and a material selected from the group consisting of substituted cyclodextrins and polymeric cyclodextrins in an effective amount to enable a stable dispersion of the dye in the aqueous liquid vehicle.

27. An ink composition according to claim 26 wherein the substituents on the cyclodextrin are selected from the group consisting of acyl groups, alkyl groups, aryl groups, tosyl groups, mesyl groups, amino groups, azido groups, halo atoms, nitro groups, phosphorus-containing groups, imidazole groups, imidazole derivative groups, pyridine groups, pyridine derivative groups, sulfur-containing groups, alcohol groups, aldehyde groups, ketone groups, oxime groups, carboxylic acid groups, carboxylic acid derivative groups, carbonate groups, carbamate groups, silicon containing groups, boron containing groups, tin containing groups, hydroxyalkyl groups.

28. An ink composition according to claim 27 wherein the substituents are selected from the group consisting of —OAc, —OC(O)CH$_2$CH$_3$, —OC(O)(CH$_2$)$_2$CH$_3$, —OC(O)(CH$_2$)$_3$CH$_3$, —OC(O)CF$_3$, —OC(O)Ph, —OCH$_3$, —OCH$_2$CH$_3$, —O(CH$_2$)$_2$CH$_3$, —OC(CH$_3$)$_3$, —OPh, —OTs, —OMs, —N$_3$, —F, —Cl, —Br, —I, —ONO$_2$, —OPO$_3$H$_2$, —OPO$_3$R$_2$ (wherein R is alkyl or aryl), —OPO$_3$HR (wherein R is alkyl or aryl), —OP(O)(CH$_3$)O—, —SCH$_3$, —SCH$_2$CH$_3$, —S(CH$_2$)$_2$CH$_3$, —SC(CH$_3$)$_3$, —OSO$_3^-$Na$^+$, —OCH$_2$SO$_3^-$Na$^+$, —OCH$_2$CH$_2$SO$_3^-$Na$^+$, —O(CH$_2$)$_3$SO$_3^-$Na$^+$, —OSi(CH$_3$)$_3$, —OSi(CH$_3$)$_2$H, —CH$_2$OSi(CH$_3$)$_3$, —CH$_2$OSi(CH$_3$)$_2$H, —OB(CH$_2$CH$_2$)$_2$, —CH$_2$OB(CH$_2$CH$_2$)$_2$, and —CH$_2$OSn((CH$_2$)$_3$CH$_3$)$_3$.

29. An ink composition according to claim 27 wherein the substituents are selected from the group consisting of hydroxyethyl groups and hydroxypropyl groups.

30. An ink composition according to claim 26 wherein the polymeric cyclodextrin is crosslinked with epichlorohydrin.

31. An ink composition according to claim 26 wherein the concentration by weight of the substituted cyclodextrin or polymeric cyclodextrin in the ink is equal to or less than the concentration by weight of the dye in the ink.

32. A process for generating images onto a substrate which comprises incorporating an ink composition comprising an aqueous liquid vehicle, a dye which exhibits a water solubility of less than about 1 gram of dye per liter of water, and a material selected from the group consisting of substituted cyclodextrins and polymeric cyclodextrins in an effective amount to enable a stable dispersion of the dye in the aqueous liquid vehicle into an ink jet printing apparatus and causing droplets of the ink composition to be ejected in an imagewise pattern onto the substrate.

33. A process according to claim 32 wherein the substituents on the cyclodextrin are selected from the group consisting of acyl groups, alkyl groups, aryl groups, tosyl groups, mesyl groups, amino groups, azido groups, halo atoms, nitro groups, phosphorus-containing groups, imidazole groups, imidazole derivative groups, pyridine groups, pyridine derivative groups, sulfur-containing groups, alcohol groups, aldehyde groups, ketone groups, oxime groups, carboxylic acid groups, carboxylic acid derivative groups, carbonate groups, carbamate groups, silicon containing groups, boron containing groups, tin containing groups, hydroxyalkyl groups.

34. A process according to claim 33 wherein the substituents are selected from the group consisting of —OAc, —OC(O)CH$_2$CH$_3$, —OC(O)(CH$_2$)$_2$CH$_3$, —OC(O)(CH$_2$)$_3$CH$_3$, —OC(O)CF$_3$, —OC(O)Ph, —OCH$_3$, —OCH$_2$CH$_3$, —O(CH$_2$)$_2$CH$_3$, —OC(CH$_3$)$_3$, —OPh, —OTs, —OMs, —N$_3$, —F, —Cl, —Br, —I, —ONO$_2$, —OPO$_3$H$_2$, —OPO$_3$R$_2$ (wherein R is alkyl or aryl), —OPO$_3$HR (wherein R is alkyl or aryl), —OP(O)(CH$_3$)O—, —SCH$_3$, —SCH$_2$CH$_3$, —S(CH$_2$)$_2$CH$_3$, —SC(CH$_3$)$_3$, —OSO$_3^-$Na$^+$, —OCH$_2$SO$_3^-$Na$^+$, —OCH$_2$CH$_2$SO$_3^-$Na$^+$, —O(CH$_2$)$_3$SO$_3^-$Na$^+$, —OSi(CH$_3$)$_3$, —OSi(CH$_3$)$_2$H, —CH$_2$OSi(CH$_3$)$_3$, —CH$_2$OSi(CH$_3$)$_2$H, —OB(CH$_2$CH$_2$)$_2$, —CH$_2$OB(CH$_2$CH$_2$)$_2$, and —CH$_2$OSn((CH$_2$)$_3$CH$_3$)$_3$.

35. A process according to claim 33 wherein the substituents are selected from the group consisting of hydroxyethyl groups and hydroxypropyl groups.

36. A process according to claim 32 wherein the polymeric cyclodextrin is crosslinked with epichlorohydrin.

37. A process according to claim 32 wherein the concentration by weight of the substituted cyclodextrin or polymeric cyclodextrin in the ink is equal to or less than the concentration by weight of the dye in the ink.

* * * * *